United States Patent
Chertov et al.

(10) Patent No.: US 11,743,157 B2
(45) Date of Patent: Aug. 29, 2023

(54) STATE EXPORT PAUSE AND RESUME

(71) Applicant: Arista Networks, Inc., Santa Clara, CA (US)

(72) Inventors: Roman Olegovich Chertov, San Jose, CA (US); Pawan Rajeev Hulyalkar, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/550,644

(22) Filed: Dec. 14, 2021

(65) Prior Publication Data

US 2023/0188442 A1    Jun. 15, 2023

(51) Int. Cl.
*H04L 43/0817* (2022.01)
*H04L 41/0853* (2022.01)

(52) U.S. Cl.
CPC ...... *H04L 43/0817* (2013.01); *H04L 41/0853* (2013.01)

(58) Field of Classification Search
CPC ............. H04L 43/0817; H04L 41/0853; H04L 41/0636; H04L 41/064
USPC .......................................................... 709/224
See application file for complete search history.

(56) References Cited

U.S. PATENT DOCUMENTS

| | | | |
|---|---|---|---|
| 7,518,986 B1 * | 4/2009 | Chadalavada | H04L 45/58 714/2 |
| 2011/0131184 A1 * | 6/2011 | Kirshenbaum | G06F 11/1435 707/694 |
| 2011/0184918 A1 * | 7/2011 | Atluri | G06F 16/2358 707/684 |
| 2020/0301882 A1 * | 9/2020 | Pogde | G06F 11/1464 |
| 2021/0165759 A1 * | 6/2021 | Bar-Nissan | G06F 16/119 |
| 2021/0216571 A1 * | 7/2021 | Chen | G06F 11/1464 |

* cited by examiner

Primary Examiner — Meng Vang
(74) Attorney, Agent, or Firm — Sprinkle IP Law Group (57) ABSTRACT

Embodiments described herein relate to techniques for state export for a network device. The method may include receiving a state export request; selecting a state hierarchy walk starting location based on the state export request; initiating a state hierarchy walk beginning at the state hierarchy walk starting location; making a first determination that a state export pause condition exists; pausing the state hierarchy walk in response to the first determination; making a second determination that a state export resume condition exists; and resuming the state hierarchy walk in response to the second determination.

20 Claims, 3 Drawing Sheets

STATE EXPORT PAUSE AND RESUME

BACKGROUND

Network devices often have a variety of state information about the network device and/or for use during operation of the network device. External entities may desire to receive all or any portion of such state information. However, to satisfy a request for state information, a network device must use compute resources. Using such resources may impact other functionality of the network device.

DETAILED DESCRIPTION

Specific embodiments will now be described with reference to the accompanying figures.

In general, embodiments described herein relate to methods, systems, and instructions stored on non-transitory computer readable mediums for pausing and resuming state export from a network device in accordance with one or more embodiments described herein.

Specifically, one or more embodiments described herein relate to the ability to export state (e.g., network device operating system (OS) state) using standard network management protocols (e.g., gNMI). More specifically, one or more embodiments described herein relate to the ability to pause and resume such state export.

Entities external to a network device often desire to receive all or any portion of the state (e.g., route information, MAC address information, next-hop information, thermal information, link layer discovery protocol (LLDP) information, etc.) of a network device. For example, an external entity may desire to synchronize a state repository with the current state (or any portion thereof) of a network device. In one or more embodiments, in order to receive state information, the external entity may send a request for state information, request state information via subscribing to periodically receive state information, etc.

In one or more embodiments, a request for state information may be received by a state export module of a network device. In one or more embodiments, the requesting entity may be verified to determine that the entity has appropriate permissions to receive the requested state information. In one or more embodiments, if the requesting entity has the requisite permissions, then state export may be initiated.

In one or more embodiments, state export may include selecting a starting point within the state hierarchy, which may be specified in, or determined based on, the request for state information received from the external entity. As an example, an external entity requesting route information may request that the starting point within the state hierarchy be "/routes/status". As another example, an external entity that is requesting all state may specify the top of the state hierarchy (e.g., "/"). In one or more embodiments, the starting point defines where, within the state hierarchy, a state hierarchy walk begins.

In one or more embodiments, a state hierarchy walk is a depth first walk of the state hierarchy to obtain attribute values, and associated paths to said values, creating a path-value pair for each item of state information obtained via the state hierarchy walk. As an example, a first object at the starting point in the state hierarchy may be examined. In one or more embodiments, attributes may exist in the object, and have certain values. In one or more embodiments, the values may be associated with the path, and the path-value pair may be obtained, and provided to the state export server for export to the requesting external entity using a standard protocol (e.g., Google Remote Procedure Call (gRPC) Network Management Interface (gNMI)).

Continuing the state hierarchy walk, some attributes may exist in the first object that include a reference to another object in the state hierarchy. Thus, the state hierarchy walk may move to the second object, and determine the attribute values therein, including continuing down the hierarchy for any attributes that include a reference to yet another object. In one or more embodiments, once a value (i.e., not a reference to another object) of all of the attributes for a given object in the state hierarchy referenced by another object have been determined, the state hierarchy walk returns to the referencing object to continue obtaining attribute values for that object, and preparing path-value pairs for export to the external entity. In one or more embodiments, the state hierarchy walk continues in this manner until all requested state has been obtained and prepared for export.

However, in one or more embodiments, the above-described state export scheme may need to be paused, and later resumed. In one or more embodiments, one reason for a pause of state export is when a state export buffer is becoming full. In one or more embodiments, the state export module exporting state path-value pairs to one or more external entities may maintain a buffer in which such path-value pairs are queued for export. In one or more embodiments, when the buffer reaches a threshold of fullness (e.g., a state export buffer threshold), the state export module may send a message to the state export process to pause the state hierarchy walk. In one or more embodiments, in response to the message, the state export process may pause the state hierarchy walk, and bookmark where, within the state hierarchy, the walk is when the pause occurs. In one or more embodiments, sometime later, when the state export buffer has sufficiently cleared (e.g., to below the state export buffer threshold), the state export module may send another message to the state export process to resume the state hierarchy walk. In one or more embodiments, in response, the state export process re-starts the state hierarchy walk at the point indicated by the bookmark.

In one or more embodiments, another reason to pause the servicing of a state export request is that preparing and exporting state uses network device resources (e.g., processor cycles), which may be needed for other operations more critical to the operation of a network device (e.g., sending keepalive signals, processing network traffic, etc.). Moreover, there may be a large quantity of state information that must be exported to service a request for state information. As an example, a request for all state information of a network device may effectively be a request for millions of items of information, requiring finding millions of attribute values and corresponding paths, preparing the path-value pairs for export, and sending the path-value pairs, which may require a large number of processor cycles and/or amount of time to perform.

To address this scenario, in one or more embodiments, when a state hierarchy walk is initiated, the time may be recorded. Subsequently, each time a message including a path-value pair representing some state information item is exported to the external entity requesting state information, the sending time may be obtained. The difference between the sending time and the time the state hierarchy walk was initiated may be determined, and compared with a configurable time threshold (e.g., a state export request threshold). In one or more embodiments, if the threshold is met or exceeded, the state hierarchy walk may be paused, again also recording a bookmark of where the state hierarchy walk was paused. In one or more embodiments, at the time of the pause, a configurable timer may be initiated, at the expiration of which the state hierarchy walk (and thus the state export) may be resumed.

Additionally, in one or more embodiments, more than one request for state may be received, with such requests being queued for servicing. In such scenarios, in one or more embodiments, there may be multiple time thresholds to consider. Each request may be associated with a request threshold that determines how long the state export process may continue for that request before pausing (described above), and there may also be a global time threshold that dictates how long a state export process may service any number of state requests before pausing. In one or more embodiments, the time threshold associated with a given request may be shorter than the global time threshold. In one or more embodiments, at the end of a time threshold associated with a given request, a determination may be made as to whether time remains in the global time threshold. In one or more embodiments, if the global time threshold has been reached, state export is paused. In one or more embodiments, if there is more time in the global time threshold, a determination may be made as to whether there are other outstanding state requests queued for servicing. In one or more embodiments, if there are no such requests, the state export process may continue for the first request until the global time threshold is reached. In one or more embodiments, if there are other requests, the state export process may begin servicing one of the outstanding state requests until its associated request threshold is reached, or until the global time threshold is met, at which point the state export process is paused. In one or more embodiments, at the time of the pause, a configurable timer may be initiated, at the expiration of which the state hierarchy walk (and thus the state export) may be resumed.

In one or more embodiments, state export may be paused for either of the two aforementioned reasons (buffer-related or time-related), and any number of either reason may occur during the servicing of a given request for state information. The series of pauses and resumes continues for a given state information request until the request has been satisfied (i.e., all requested state has been exported to the requesting external entity).

Figure 1:
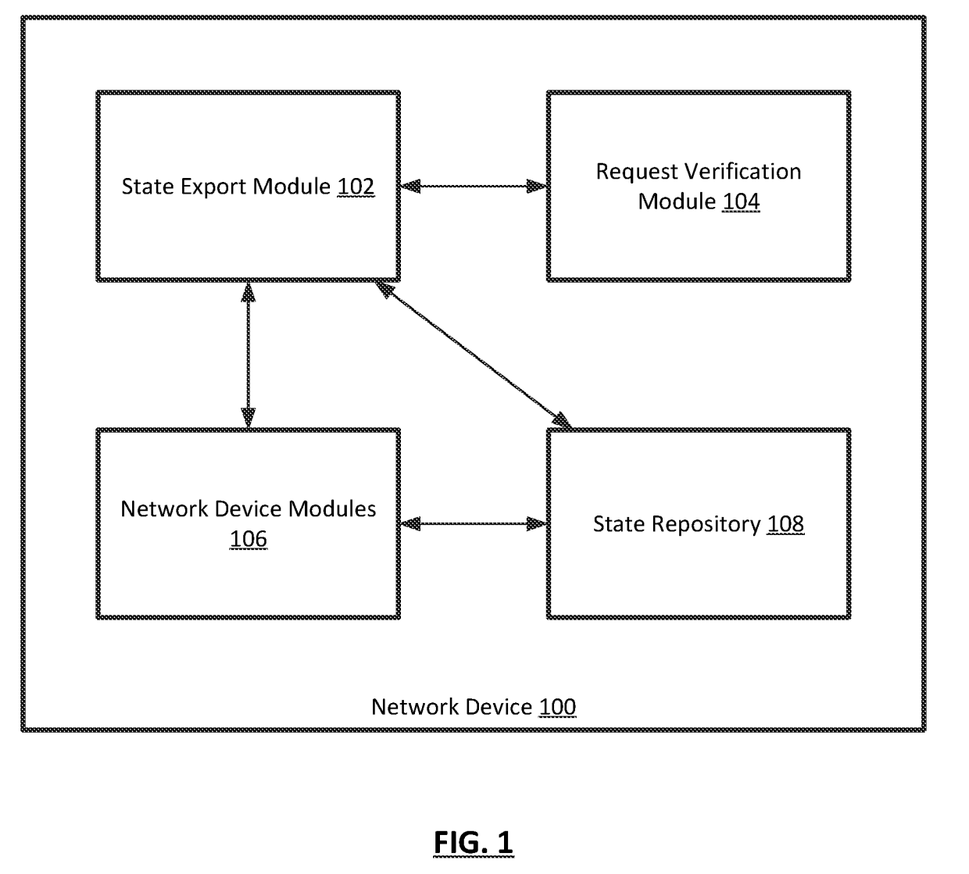
FIG. 1 shows a system for state export in accordance with one or more embodiments described herein.

FIG. 1 shows a system in accordance with one or more embodiments described herein. As shown in FIG. 1, the system includes network device (100). Network device (100) may include state export module (102), request verification module (104), any number of network device modules (106), and any number of state repositories (e.g., state repository (108)). Each of these components is described below.

In one or more embodiments, network device (100) is a device that includes and/or is connected to persistent storage (not shown), memory (e.g., random access memory (RAM)) (not shown), one or more processor(s) (e.g., integrated circuits) (not shown), and at least one physical network interface (which may also be referred to as a port), which may provide connections (i.e., links) to other devices (e.g., computing devices, other network devices, etc.). In one or more embodiments, network device (100) also includes any number of additional components (not shown), such as, for example, network chips, field programmable gate arrays (FPGAs), application specific integrated circuits (ASICs), indicator lights (not shown), fans (not shown), etc. Network device (100) may include any other components without departing from the scope of embodiments described herein.

In one or more embodiments, network device (100) includes any software configured to perform various functions of the network device (e.g., to process packets). Such software may, for example, execute using one or more processors of a network device, and/or any other hardware resource of a network device capable of executing software.

Examples of a network device, such as network device (100), include, but are not limited to, a network switch, a router, a multilayer switch, a fibre channel device, an InfiniBand® device, etc. A network device is not limited to the aforementioned specific examples.

In one or more embodiments, network device (100) includes functionality to receive network traffic data units (e.g., frames, packets, tunneling protocol frames, etc.) at any of the network interfaces (i.e., ports) of a network device, and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of network traffic data unit processing include, but are not limited to, performing a determining: (i) whether to take a security action (e.g., drop the network traffic data unit); (ii) whether to mirror the network traffic data unit; and/or (iii) how to route/forward the network traffic data unit in order to transmit the network traffic data unit from an interface of network device (100).

In one or more embodiments, network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., network devices) that facilitate network connectivity for one or more connected devices (e.g., computing devices, data storage devices, other network devices, etc.) (not shown). In one or more embodiments, a network device and other devices within the network are arranged in a network topology (not shown). In one or more embodiments, a network topology is an arrangement of various devices of a network.

In one or more embodiments, the persistent storage and/or memory (not shown) of network device (100) may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of network device (100) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of network device (100), cause the one or more processors and/or other hardware components to perform operations in accordance with one or more embodiments described herein.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, network device (100) includes a state export module (102). In one or more embodiments, a module is hardware (e.g., circuitry), software, firmware, or any combination thereof. As an example, a module may be one or more software process(es) executing using the circuitry of one or more processors and/or other hardware of network device (100) to perform any functionality of network device (100). A module may be referred to, for example, as an agent. In one or more embodiments, state export module (102) includes functionality to receive requests for state export from any number of external entities and, if the requesting entity is properly verified, to service the state export request(s) by exporting state information to the requesting external entity. One example of a state export module is a gRPC server, in which case the one or more entities that request state information may be considered as clients.

In one or more embodiments, to obtain the state information for export, state export module (102) may include functionality to perform state hierarchy walks. In one or more embodiments, a state hierarchy walk is a depth first traversal of a hierarchy of state information from a defined starting point in a state hierarchy, in order to obtain path-value pairs representing the requested state information of the network device. In one or more embodiments, state export module (102) includes functionality to, as state information is obtained, convert the state information into a suitable format for export using a standard state export protocol, such as, for example, gNMI. Although FIG. 1 shows state export module (102) as a single module, state export module may be any number of processes executing on the network device. As an example, there may be a process for receiving state export requests and transmitting obtained state, and another process for accessing the requested state and performing a state hierarchy walk. As another example, a portion of state export module (102) may be distributed among any number of other modules, agents, etc. executing on a network device, as sub-modules (e.g., sub-agents). Such sub-modules may, for example, perform the state hierarchy walks to service state export requests, and provide the obtained state information to state export module (102) for export.

In one or more embodiments, network device (100) includes request verification module (104). In one or more embodiments, request verification module (104) is connected to state export module (102). In one or more embodiments, request verification module (104) is a module (described above). In one or more embodiments, request verification module (104) includes functionality to receive verification requests from state export module (102), and to perform verifications based on the requests. In one or more embodiments, a verification request may be a request to verify whether an external entity requesting export of all or any portion of the state information of network device (100) has permission to receive the requested state. Any scheme for such verification may be used without departing from the scope of embodiments described herein.

In one or more embodiments, network device (100) includes any number of network device modules (106), each of which may be a module (described above). In one or more embodiments, network device modules (106) are connected to state export module (102). In one or more embodiments, a network device module may include functionality to perform any of the functionality of network device (100). There may be any number of network device modules (106). Examples of network device modules (106) include, but are not limited to, state management modules, routing protocol modules, network device health modules, etc. In one or more embodiments, a network device module (106) may manage at least a portion of the state information of network device (100). In one or more embodiments, network device modules (106) may provide access to state information to state export module (102). Such access may be provided, for example, by mounting a state information hierarchy for access by state export module (102). Additionally or alternatively, network device modules (106) may include sub-modules for accessing state information to perform state hierarchy walks on behalf of state export module (102), and providing the state information obtained during such state hierarchy walks to state export module (102) for export to the entity requesting state information.

In one or more embodiments, network device (100) includes state repository (108). In one or more embodiments, state repository (108) stores state information (e.g., route information, MAC address information, next-hop information, thermal information, link layer discovery protocol (LLDP) information, etc.) of network device (100). In one or more embodiments, state repository (108) is connected to the state export module (102) and/or to network device modules (106). In one or more embodiments, state repository (108) is a data repository (described above). State repository (108) may include any number of data structures of any type, each storing at least a portion of the state information of a network device (100). As an example, state information may be organized similar to a file system, in which each item of state information has an associated path where the information is stored, which may be referred to as a state hierarchy. In one or more embodiments, a given path in a state hierarchy may store (e.g., as an object) one or more values of one or more state attributes, or references to other locations in which a value of a state attribute (or another reference to another location) may be stored. There may be any number of such references in a state hierarchy leading to a value of a state attribute. In one or more embodiments, a path leading to a value of a state attribute of network device (100), along with the value, may be referred to as a path-value pair, and a state hierarchy walk may be performed to obtain any number of path-value pairs. Such path value-pairs may be in, or converted into, any format suitable for exporting state information from network device (100). As an example, state information obtained during a state hierarchy walk may be converted into path-value pairs suitable for export based on the gNMI protocol.

While FIG. 1 shows a configuration of components, other configurations may be used without departing from the scope of embodiments described herein. Accordingly, embodiments disclosed herein should not be limited to the configuration of devices, elements, and/or components shown in FIG. 1.

Figure 2:
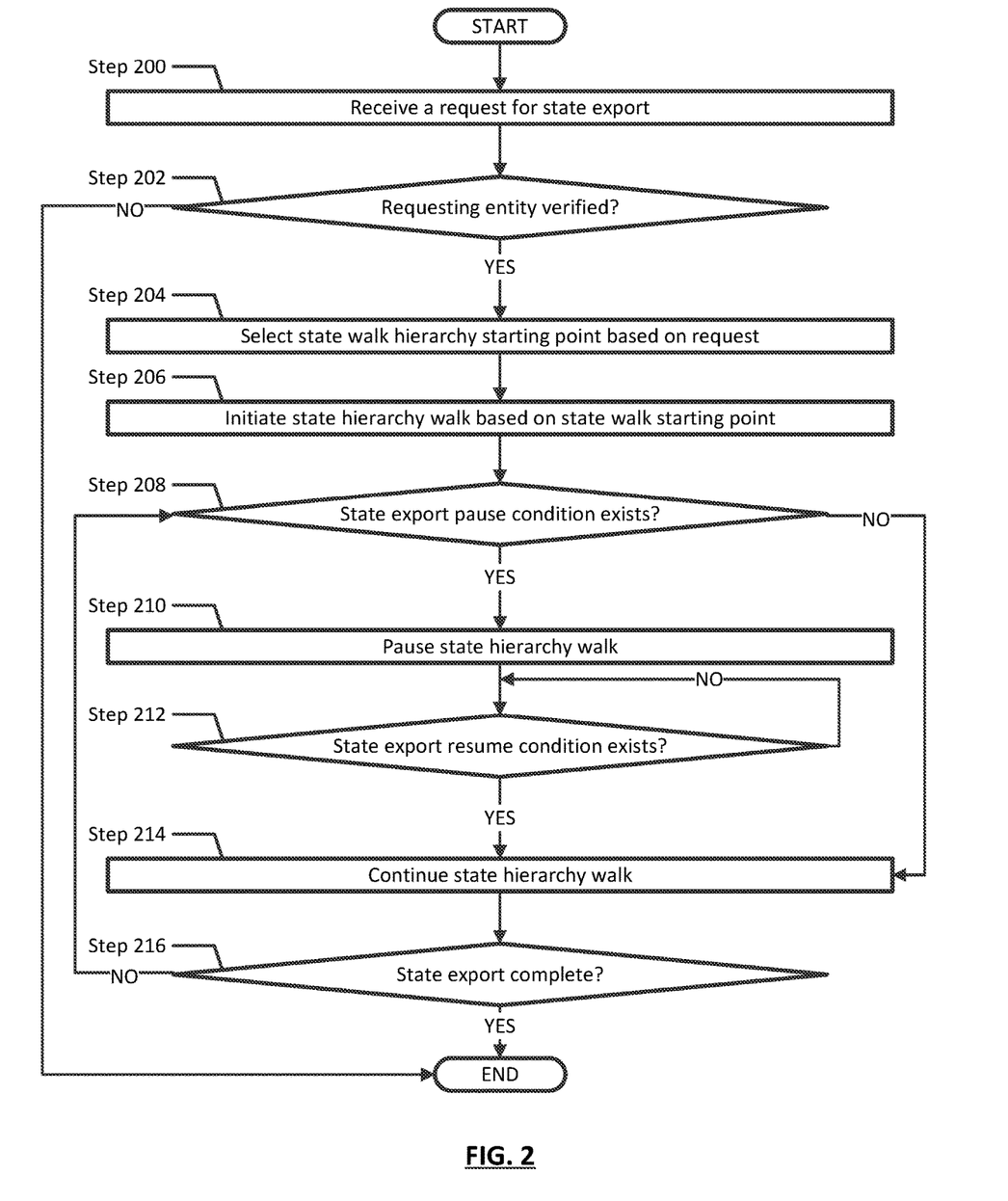
FIG. 2 shows a flowchart of a method for pausing and resuming state export in accordance with one or more embodiments described herein.

FIG. 2 shows a flowchart describing a method for pausing and resuming state export in accordance with one or more embodiments described herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that steps other than those shown in FIG. 2 may be performed.

In Step 200, a request for state export is received. In one or more embodiments, the request is received by a state export module of a network device. In one or more embodiments, the request is from an external entity seeking all or any portion of the state information of the network device. Such a request may be a one-time request or part of a series of requests. Such a request may be part of a subscription by the external entity to receive certain state information from the network device at periodic intervals, upon changes to the state information, etc.

In one or more embodiments, the request includes an indication of what portion of the state information is being requested. The request may include a state hierarchy walk starting location that specifies a path in a state hierarchy at which to start a state hierarchy walk to obtain the state information being sought by the external entity. As an example, the request seeking information about routes stored by the network device may specify "/routes/status" as a state hierarchy walk starting point. As another example, a request seeking all state information of a network device may specify "/" as a state hierarchy walk starting point to indicate that all state is being sought. Additionally or alternatively, in one or more embodiments, the request may specify the portion of state information of the network device being sought, and the state export module of the network device may use the information in the request to determine an appropriate state hierarchy walk starting point to use when performing a state hierarchy walk to obtain the requested state information.

In Step 202, a determination is made as to whether the requesting entity is verified to receive the state information being requested. In one or more embodiments, the verification includes determining whether the entity making the request has appropriate permissions to receive the state information being requested. Any scheme for such verification may be used without departing from the scope of embodiments described herein. In one or more embodiments, if the verification fails, the method ends, and the state export request is not serviced. In one or more embodiments, if the verification succeeds, the method proceeds to Step 204.

In Step 204, a state hierarchy walk starting point is selected based on the request received in Step 200. In one or more embodiments, a state hierarchy walk starting point is a location within the state hierarchy at which to start a state hierarchy walk in order to obtain the state information being requested.

In Step 206, a state hierarchy walk is initiated based on the state hierarchy walk starting point selected in Step 204. In one or more embodiments, initiating a state hierarchy walk includes making the relevant portion of the state hierarchy available to the entity performing the state hierarchy walk. Making the state hierarchy available may include mounting the state hierarchy in a location accessible by the state export module, or a process executing therein. Additionally or alternatively, making the state hierarchy available may include identifying and requesting that a sub-module of another network device module that already has access to the state hierarchy perform the state hierarchy walk, and communicate the results back to the state export module. In one or more embodiments, as the state hierarchy walk is being performed, the path-value pairs obtained, which represent the requested state information, are converted into an appropriate format for exporting pursuant to a state export protocol (e.g., gNMI), and exported to the external entity that requested the state information in Step 200. In one or more embodiments, the actual export of the state information may occur at a slower rate than the path-value pairs are obtained by the state hierarchy walk, in which case the state information may be added to a buffer, which the state export module works to clear by exporting the state information.

In one embodiment, the exported state information may be referred to as a state data item. The state data item includes the path, the value, and, optionally, a timestamp indicating a time at which the value last changed. The state data item may include additional information without departing from the disclosure. Further, the state data item may be formatted in accordance with the state export protocol (e.g., gNMI).

In Step 208, a determination is made as to whether a state export pause condition exists. In one or more embodiments, a state export pause condition is any condition that requires a pause of the state hierarchy walk.

In one or more embodiments, a state export pause condition is that a state export buffer threshold is met. In one or more embodiments, the entity (e.g., a state export module of a network device) performing the export of the state information may have a buffer in which state information is stored until the state information can be exported. In one or more embodiments, a state export buffer threshold is an amount of information in the buffer above which the state export module needs to pause the state hierarchy walk so that the buffer does not overflow, thereby potentially causing some state information to not be exported. A state export buffer threshold may be quantified in any way. As an example, the threshold may be a data size threshold specifying a quantity of data. As another example, the threshold may be a quantity of entries in the buffer.

In one or more embodiments, a state export pause condition is related to one or more state export time thresholds. In one or more embodiments, each request for state information may be assigned a state export request time threshold, which may be referred to as a request threshold. In one or more embodiments, for each request for state information for which a state hierarchy walk is started, a time at which the state hierarchy walk begins is recorded. In one or more embodiments, each time a portion of the state information that was requested is exported, the time of transmission is recorded. In one or more embodiments, the two times are compared, and when the time difference exceeds a configured state export time threshold, then a state export pause condition exists. In one or more embodiments, the request threshold is configured in order to avoid the processor cycles of the network device being used to service state requests for an amount of time greater than the threshold, to ensure that the processor cycles of the network device are not consumed by servicing the state request in lieu of performing other functionality of the network device, such as, for example, processing network traffic, which may negatively impact the operation of the network device.

In one or more embodiments, determining whether a state export pause condition exists also includes assessing whether a global state export time threshold has been met. In one or more embodiments, when any state hierarchy walk is initiated, a global state export timer is started that measures the amount of time that any one or more state hierarchy walks have been performed. In one or more embodiments, once a determination is made that a request threshold associated with a state information request has been exceeded, a further determination is made as to whether the global state export threshold has been exceeded.

In one or more embodiments, if the global state export threshold has not been exceeded, a determination is made as to whether there are other outstanding state information requests to be serviced. In one or more embodiments, if there are no such other requests, then a new time is recorded for the state hierarchy walk, which is continued until the global threshold is exceeded (checking periodically for other requests each time the request threshold is reached), at which point a state export pause condition exists.

In one or more embodiments, if there are other outstanding state information requests, then the state export may begin a different state hierarchy walk to obtain the state information for the other request, which has its own associated request threshold. In one or more embodiments, that state hierarchy walk is continued until the global threshold is exceeded (again, checking for other requests each time a request threshold is reached), at which point a state export pause condition exists.

In one or more embodiments, multiple concurrent state information requests are serviced by starting state hierarchy walks to begin state export, pausing the state hierarchy walks at the expiration of an associated request time threshold, and cycling through state hierarchy walks to service other requests, until such time as the global time threshold for servicing state information requests via state hierarchy walks is exceeded, at which point a state export pause condition exists In one or more embodiments, if a state export pause condition does not exist, then the method proceeds to Step 214. In one or more embodiments, if a state export pause condition exists, then the method proceeds to Step 210.

In Step 210, the state hierarchy walk is paused, based on the determination, in Step 208, that a state export pause condition exists. In one or more embodiments, although the state hierarchy walk is paused, the state export module may continue to export state information from the buffer in which it is queued for export, so as to clear space in the buffer. In one or more embodiments, if the state export condition was based on a time based threshold (either for a specific request or the global threshold), then a timer may be initiated to measure the time since the pause occurred.

In Step 212, a determination is made as to whether a state export resume condition exists. If the state export pause condition of Step 208 was based on a state export buffer threshold, then the state export resume condition may be that the buffer has been sufficiently cleared (e.g., below a second state export buffer threshold). If the state export pause condition of Step 208 was based on a time threshold (request-specific or global), then the state export resume condition may be that a timer started when the pause occurred has expired. In one or more embodiments, if a state export resume condition does not exist, then the method continues to wait. In one or more embodiments, if a state export resume condition exists, then the method proceeds to Step 214.

In Step 214, the state hierarchy walk that was paused in Step 210 is resumed. In one or more embodiments, the state hierarchy walk is resumed at a point in the state hierarchy based on a bookmark of the location where the state hierarchy walk was when the pause occurred. Such a bookmark may have been generated as part of pausing the state hierarchy walk, and indicate the specific location in the state hierarchy at which to resume the state hierarchy walk.

In Step 216, a determination is made as to whether the state export is complete. In one or more embodiments, the state export is complete when the state information requested in Step 200 has been exported to the requesting entity. In one or more embodiments, if the state export is not complete, the method returns to Step 208 to determine if a state export pause condition exists. In one or more embodiments, if the state export is complete, the method ends.

Figure 3:
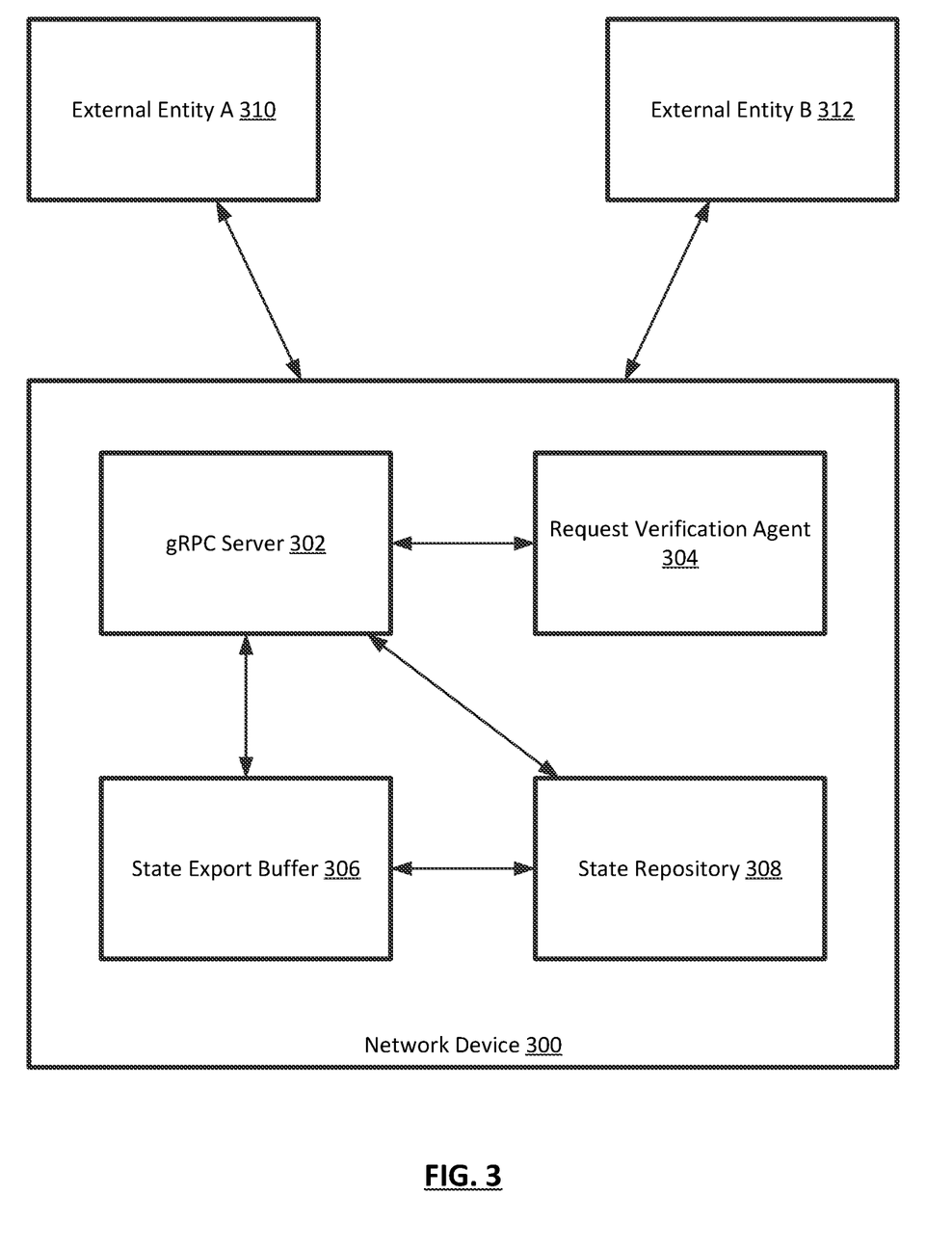
FIG. 3 shows an example in accordance with one or more embodiments described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Example

Referring to FIG. 3, consider a scenario in which a network device (300) includes a gRPC server (302), a request verification agent (304), a state export buffer (306), and a state repository (308). The network device (300) is connected to external entity A (310) and external entity B (312).

In such a scenario, at a first time, external entity A (310) sends a request to network device (300) for all routing state information of network device (300). The request is received by gRPC server (302) (i.e., part of a state export module). In response to the request, the gRPC server sends a message to request verification agent (304), which confirms that external entity A (310) has permissions necessary to receive the requested state information.

Next, the gRPC server establishes a connection with external client A using a socket of the network device for exporting the requested state information in a format compatible with the gNMI protocol. Next, the portion of the state repository that includes the requested state information is mounted in a location that is accessible by a state hierarchy walk process, and the gRPC server initiates a state hierarchy walk by that process.

Sometime later, a determination is made that the state export buffer (306) has reached a level of being over 90% full, which is the state export buffer threshold configured on network device (300). Accordingly, a state export pause condition has been reached. Therefore, the state hierarchy walk is paused. While the state hierarchy walk is paused, gRPC server (302) continues to prepare and transmit state information out of state export buffer (306). When the buffer falls below 20% full (i.e., a second state export buffer threshold), the state export hierarchy walk is resumed, and continues until the requested state information has been exported to external entity A (310).

At a second time, external entity A (310) sends another request for routing state information to a network device (300). At a third time, after the second time but before the request from external device A has been completely serviced, external device B (312) sends a request for all state information of network device (300). The requests are received by gRPC server (302). The request from external device B (312) is queued, as the request from external entity A is already being serviced when the request from external entity B is received.

A request time threshold of one minute is assigned to the request from external entity A. A request time threshold of three minutes is assigned to the request from external entity B. A global state export time threshold of three minutes is configured on the network device (300).

When the state hierarchy walk for servicing the request from external entity A (310) is started, the time is recorded. Each time a path-value pair representing a portion of the routing state information requested by external entity A (310), the time of transmission is compared against the time the state hierarchy walk was started. After one minute, that threshold is met. Therefore, gRPC server (302) checks the state export request queue, and determines that it includes the request from external entity B (312). gRPC server (302) also determines that the global time threshold of three minutes has not been reached. Therefore, the state hierarchy walk for servicing the request from external entity A is paused, and a state hierarchy walk for servicing the request from external entity B is started.

After two more minutes, gRPC server (302) determines that the global time threshold for state export has been reached. In response to the global time threshold for state export being reached, the state export walk for servicing the request from external entity B is paused, and a timer of five minutes is started.

After the five minute timer expires, the gRPC server resumes the state hierarchy walk to service the request from external entity A. The state hierarchy walk is completed, and the requested routing state information is exported to external entity A (310) before the state export request threshold associated with the request from external entity A (310) is reached.

Next, the gRPC server again checks the global time threshold, and determines that it has not been reached. Therefore, the state hierarchy walk to service the request from external entity B is resumed, and completes before either the request time threshold associated with the request from external entity B or the global time threshold are met, thereby completing the servicing of all outstanding state requests.

End of Example

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase connected, or operative connection, means that there exists between elements/components/devices a direct or indirect connection that allows the elements to interact with one another in some way. For example, the phrase 'connected' may refer to any direct (e.g., wired directly between two devices or components) or indirect (e.g., wired and/or wireless connections between any number of devices or components connecting the connected devices) connection. Thus, any path through which information may travel may be considered an operative connection.

While a limited number of embodiments have been described herein, those skilled in the art, having the benefit of this disclosure, will appreciate that other embodiments can be devised which do not depart from the scope of the embodiments described herein. Accordingly, the scope of embodiments described herein should be limited only by the attached claims.

What is claimed is:

1. A method for state export for a network device, the method comprising:
   receiving a state export request;
   selecting a state hierarchy walk starting location based on the state export request;
   initiating a state hierarchy walk beginning at the state hierarchy walk starting location, wherein the state hierarchy walk traverses a state hierarchy of the network device and retrieves state attribute values representing a state of the network device;
   making a first determination that a state export pause condition exists, the state export pause condition determined based on at least one of: an amount of state attribute information stored in an export buffer; and a first elapsed time associated with the state hierarchy walk;
   pausing the state hierarchy walk in response to the first determination;
   making a second determination that a state export resume condition exists, the state export resume condition determined based on at least one of: the amount of state attribute information stored in the export buffer; and a second elapsed time associated with the state hierarchy walk; and
   resuming the state hierarchy walk in response to the second determination.

2. The method of claim 1, wherein making the first determination that the state export pause condition exists comprises:
receiving a first message indicating that the amount of state attribute information stored in the export buffer meets a first state export buffer threshold.

3. The method of claim 2, wherein making the second determination that the state export resume condition exists comprises:
receiving a second message indicating that the amount of state attribute information stored in the export buffer meets a second state export buffer threshold.

4. The method of claim 1, further comprising:
recording a first time at which the state hierarchy walk is initiated,
wherein making the first determination that the state export pause condition exists comprises:
recording a second time at which a state data item is transmitted; and
making a third determination, using the first time and the second time, that a state export time threshold is met.

5. The method of claim 4, further comprising:
initiating a state export pause timer after pausing the state hierarchy walk,
wherein making the second determination that the state export resume condition exists comprises determining that the state export pause timer has expired.

6. The method of claim 4, wherein the state export time threshold is a global state export time threshold.

7. The method of claim 4, wherein the state export time threshold is a single-request state export time threshold, and the method further comprises, before the resuming of the state hierarchy walk:
making a fourth determination that a second state export request has been received;
making a fifth determination, based on the fourth determination, that a global state export threshold has not been met; and
initiating, based on the fifth determination, a second state hierarchy walk to service the second state export request.

8. The method of claim 7, further comprising, after initiating the second state hierarchy walk:
making a sixth determination that the global state export threshold is met; and
pausing, based on the sixth determination, the second state hierarchy walk.

9. The method of claim 1, further comprising:
generating, after the pausing of the state hierarchy walk, a state export bookmark comprising a state walk pause point,
wherein the resuming of the state hierarchy walk begins at the state walk pause point.

10. The method of claim 4, further comprising, during the state hierarchy walk:
obtaining a value of an attribute of a state object;
obtaining a path associated with the value; and
exporting a state data item comprising the path, the value, and a timestamp indicating a time at which the value last changed.

11. A non-transitory computer readable medium comprising computer readable program code, which when executed by a computer processor enables the computer processor to perform a method for state export for a network device, the method comprising:
receiving a state export request;
selecting a state hierarchy walk starting location based on the state export request;
initiating a state hierarchy walk beginning at the state hierarchy walk starting location, wherein the state hierarchy walk traverses a state hierarchy of the network device and retrieves state attribute values representing a state of the network device;
making a first determination that a state export pause condition exists, the state export pause condition determined based on at least one of: an amount of state attribute information stored in an export buffer; and an elapsed time associated with the state hierarchy walk;
pausing the state hierarchy walk in response to the first determination;
making a second determination that a state export resume condition exists; and
resuming the state hierarchy walk in response to the second determination.

12. The non-transitory computer readable medium of claim 11, wherein:
making the first determination that the state export pause condition exists comprises receiving a first message indicating that the amount of state attribute information stored in the export buffer meets a first state export buffer threshold, and
making the second determination that the state export resume condition exists comprises receiving a second message indicating that the amount of state attribute information stored in the export buffer meets a second state export buffer threshold.

13. The non-transitory computer readable medium of claim 11, further comprising:
recording a first time at which the state hierarchy walk is initiated,
wherein making the first determination that the state export pause condition exists comprises:
recording a second time at which a state data item is transmitted; and
making a third determination, using the first time and the second time, that a state export time threshold is met.

14. The non-transitory computer readable medium of claim 13, further comprising:
initiating a state export pause timer after pausing the state hierarchy walk,
wherein making the second determination that the state export resume condition exists comprises determining that the state export pause timer has expired.

15. The non-transitory computer readable medium of claim 13, wherein the state export time threshold is a global state export time threshold.

16. The non-transitory computer readable medium of claim 13, wherein the state export time threshold is a single-request state export time threshold, and the method further comprises, before the resuming of the state hierarchy walk:
making a fourth determination that a second state export request has been received;
making a fifth determination, based on the fourth determination, that a global state export threshold has not been met; and
initiating, based on the fifth determination, a second state hierarchy walk to service the second state export request.

17. The non-transitory computer readable medium of claim 16, further comprising, after initiating the second state hierarchy walk:

making a sixth determination that the global state export threshold is met; and pausing, based on the sixth determination, the second state hierarchy walk.

18. The non-transitory computer readable medium of claim 6, further comprising:

generating, after the pausing of the state hierarchy walk, a state export bookmark comprising a state walk pause point, wherein the resuming of the state hierarchy walk begins at the state walk pause point.

19. The non-transitory computer readable medium of claim 11, further comprising, during the state hierarchy walk:

obtaining a value of an attribute of a state object;

obtaining a path associated with the value; and exporting a state data item comprising the path, the value, and a timestamp indicating a time at which the value last changed, wherein the state data item is in a format corresponding to a state export protocol.

20. A system for state export for a network device, the system comprising:

a network device comprising:

a processor comprising circuitry;

memory; and a state export module, executing on the processor and using the memory, and configured to:

receive a state export request;

select a state hierarchy walk starting location based on the state export request;

initiate a state hierarchy walk beginning at the state hierarchy walk starting location, wherein the state hierarchy walk traverses a state hierarchy of the network device and retrieves state attribute values representing a state of the network device;

make a first determination that a state export pause condition exists, the state export pause condition determined based on at least one of: an amount of state attribute information stored in an export buffer; and an elapsed time associated with the state hierarchy walk;

pause the state hierarchy walk in response to the first determination;

make a second determination that a state export resume condition exists; and resume the state hierarchy walk in response to the second determination.

\* \* \* \* \*